United States Patent
Seely et al.

(10) Patent No.: US 11,502,904 B2
(45) Date of Patent: Nov. 15, 2022

(54) SYSTEMS AND METHODS FOR AUTOMATIC FEEDBACK CONTROL IN A DISTRIBUTED CONTROL SYSTEM

(71) Applicant: General Electric Company, Schenectady, NY (US)

(72) Inventors: William Forrester Seely, Greenville, SC (US); David Ewens, Greenville, SC (US); Benjamin Laskowski, Greenville, SC (US); John Raffensperger, Greenville, SC (US); Karl Minto, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 184 days.

(21) Appl. No.: 15/862,267

(22) Filed: Jan. 4, 2018

(65) Prior Publication Data

US 2019/0207810 A1    Jul. 4, 2019

(51) Int. Cl.
| | |
|---|---|
| *G05B 19/042* | (2006.01) |
| *H04L 41/082* | (2022.01) |
| *H04W 76/10* | (2018.01) |
| *H04L 43/0811* | (2022.01) |
| *H04L 41/0654* | (2022.01) |
| *G05B 23/02* | (2006.01) |
| *H04L 43/08* | (2022.01) |

(Continued)

(52) U.S. Cl.
CPC ........ *H04L 41/082* (2013.01); *G05B 19/0428* (2013.01); *G05B 23/0251* (2013.01); *H04L 41/0654* (2013.01); *H04L 43/0811* (2013.01); *H04W 76/10* (2018.02); *G05B 2219/25232* (2013.01); *H04L 12/28* (2013.01); *H04L 41/044* (2013.01); *H04L 43/08* (2013.01)

(58) Field of Classification Search
CPC .............. H04L 41/082; H04L 41/0654; H04L 43/0811; H04L 12/28; H04L 41/044; H04L 43/08; H04W 76/10; G05B 19/0428; G05B 23/0251; G05B 2219/25232
USPC ......................................................... 700/28
See application file for complete search history.

(56) References Cited

U.S. PATENT DOCUMENTS

| | | | | |
|---|---|---|---|---|
| 6,061,600 A | * | 5/2000 | Ying | G05B 9/03 700/3 |
| 2008/0005256 A1 | * | 1/2008 | Shibayama | G05B 9/03 709/208 |

(Continued)

*Primary Examiner* — Michael W Choi
(74) *Attorney, Agent, or Firm* — Eversheds Sutherland (US) LLP (57) ABSTRACT

Systems and methods for automatic feedback control are provided. According to one embodiment of the disclosure, a method for automatic feedback control may commence with receiving high-level control references by a low-level controller communicatively coupled to a high-level controller via the network connection. The method may further include generating, by the low-level controller, low-level control references for a hardware asset based at least in part on the high-level control references. The method may continue with transferring control of the hardware asset to the low-level controller in response to a loss of the network connection. The method may further include adjusting the low-level control references by a low-level control mechanism associated with the low-level controller in response to the loss of the network connection.

11 Claims, 10 Drawing Sheets

(51) Int. Cl.
*H04L 12/28* (2006.01)
*H04L 41/044* (2022.01)

(56) References Cited

U.S. PATENT DOCUMENTS

2013/0131839 A1* 5/2013 Washington ......... G05B 19/042
  700/19
2017/0199515 A1* 7/2017 Bhat .................. G05B 19/4184

* cited by examiner

SYSTEMS AND METHODS FOR AUTOMATIC FEEDBACK CONTROL IN A DISTRIBUTED CONTROL SYSTEM

TECHNICAL FIELD

The disclosure relates to maintenance of hardware assets and, more specifically, to systems and methods for automatic feedback control in a distributed control system.

BACKGROUND

Installation and upgrade of a control system typically require interrupting normal operations of the hardware assets being controlled. Such interruptions can be costly, especially when the hardware assets include heavy duty power generation units. Therefore, even though upgrades could result in increased efficiencies of the hardware assets, customers often opt to delay the upgrades or choose not to upgrade at all because they cannot afford to take the hardware assets offline.

Conventional solutions for upgrading a control system distribute control of hardware assets across multiple identical controllers for redundancy's sake with each controller containing the entirety of the controls. For example, an offline control system can be upgraded while the redundant system is operational. When the upgrade is complete, the control can be gracefully transferred back to the upgraded system. This technique entails preserving state information for each component of the hardware asset while switching from one system to another.

However, the state information may change unpredictably during the upgrade. This can result in disparities because some software associated with the controller has changed, or has been deleted or added. Because the handover could not be handled properly, this approach often results in tripping or even causing a significant change to the hardware asset. Over time, customers may lose trust in the upgrade process and discontinue its use altogether. The conventional techniques are inadequate due to the requirement of upgrading low level components directly responsible for controlling operations of hardware actuators.

In a multi-level control, a control algorithm can be split between multiple controllers. However, when splitting the control algorithm across multiple controllers, it is difficult to maintain communication between different parts of the algorithm and handle possible loss of communication between controllers. Conventional solutions often require an intermediary piece of hardware to accomplish both tasks, which is cost prohibitive compared to two specialized controllers.

Furthermore, conventional control models operate as one system and it is too computationally complex to control low-level components that may require real-time speeds. Attempting to increase the speed of the conventional control models can result in operation that is too fast for some sub-models which need to be run at a slow, non-real-time pace.

BRIEF SUMMARY OF THE DISCLOSURE

This disclosure relates to systems and methods for industrial network monitoring. Certain embodiments of the disclosure can provide procedures for monitoring and diagnostics of electrical equipment of a plant based on analysis of a data network. Some embodiments of the disclosure may facilitate early predictions of failures of electrical and mechanical plant equipment.

According to one embodiment of the disclosure, a system for automatic feedback control is provided. The system may include a high-level controller, a low-level controller, and a low-level control mechanism. The low-level controller may be in communication with the high-level controller via a network through a communications network connection. The low-level controller may be configured to receive, via the network connection, high-level control references from the high-level controller. The low-level controller may be further configured to generate low-level control references for a hardware asset based at least in part on the high-level control references. The low-level controller may be configured to facilitate control of the hardware asset in response to detecting a loss of the network connection. The low-level control mechanism may be associated with the low-level controller and configured to adjust the low-level control references in response to the loss of the network connection.

According to another embodiment of the disclosure, a method for automatic feedback control is provided. The method may commence with receiving high-level control references by a low-level controller communicatively coupled to a high-level controller via the network connection. The method may further include generating, by the low-level controller, low-level control references for a hardware asset based at least in part on the high-level control references. The method may continue with transferring control of the hardware asset to the low-level controller in response to a loss of the network connection. The method may further include adjusting the low-level control references by a low-level control mechanism associated with the low-level controller in response to the loss of the network connection.

Other embodiments, systems, methods, features, and aspects will become apparent from the following description taken in conjunction with the following drawings.

DETAILED DESCRIPTION

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure can include methods for automatic feedback control within a distributed control system. Approaches described herein can allow automatic feedback control across a distributed set of controllers on a network by splitting a control logic between two or more controllers. A hierarchy of controllers can be established with low-level controllers being closer to the hardware under control (e.g., sensors and actuators). The control logic can include automatic feedback control using proportional-integral-derivative (PID) loops arranged as a set of cascading controllers where outer loop controllers send references to inner loop controllers and the inner-most loop includes actuator controls.

This control logic can be split among multiple controllers and facilitate handling of the communications between a high-level controller and a low-level controller. An output of the high-level controller can be used as a reference signal (input) for the lower controller. The control logic can be accounting for the possibility that the network connection between the high-level controller and the low-level controller can be severed and prevent actuators under control from being significantly impacted by the outage. When splitting the control logic across multiple controllers, techniques need to be employed for allowing communications between different parts of the control logic, which also account for the chance of loss-of-communication between controllers.

Certain embodiments of the disclosure allow a complex control logic to be distributed across multiple controllers where the low-level, simple, and fast portion of the algorithm can be run on a low-spec real-time controller and the high-level, complex, slow portion of the algorithm is run on a high-spec non-real-time controller. This approach can prevent the need for an intermediary hardware that accomplishes both tasks, which is cost prohibitive compared to two specialized controllers.

In one example embodiment (also referred to herein as the "switching method"), the lower controller includes a switch at the reference to the control loop that is normally selecting the reference from the high-level controller's output, and in the event of a network loss, the control reference is switched over to a surrogate of the high-level reference that resides within the lower controller.

In a further example embodiment (also referred to herein as the "biasing method"), the high-level controller's output is an adder to the existing low-level controller's reference.

In yet a further example embodiment (also referred to herein as the "tuning method"), the low-level control reference is some function or a lookup table, and the high-level control algorithm adjusts the parameters of the low-level method. In the tuning method, it is possible to have a slower tuning loop at the high level that can periodically lose connection to the low level without suffering from the normal loss of connection problems.

Certain embodiments of the disclosure can include methods for splitting a model across a distributed control system. Some of the models that are beneficial to use in model based control systems can be too computationally complex to operate within the real-time controller, and require too fast of operation for some sub-models to be run at a slow, non-real-time pace in the high-level controllers.

A model used for various forms of model-based control can benefit from high fidelity (which can be achieved in the high-level controller) and from speed of execution for matching fast transients (which can be achieved in the faster real-time controller). To allow both objectives to be achieved, the model can be split into multiple sub-models, with some connected in series or parallel and some in a cascade format where a high level slow model contains the faster low-level model. Sub-models that need to match Input/Output (I/O), particularly faster I/O or those that are important during fast transients, can be placed in the low-level controller. The remaining sub-models can be left in the high-level controller.

The low level sub-models can contain a failover or surrogate that allows for the loss of the high level sub-models to avoid a fault of the model. This can be done by either stopping the model from being used in the control system while the control system is still in use but not tuning the model to the slower high level components, or maintaining the existing high-level model parameters and using surrogate sub-models of lower complexity to replace them in a degraded manner until the network is restored. The second crossover component can include the high level sub-models that are parent to a faster sub-model in the low-level controller and can require software to broker the exchange between disparate timeframes. This approach can include passing parameters between the models at the slower model's rate or collecting an array of data for matching at the low level, and passing it up to the high level in blocks of data for it to operate on.

Splitting the model into multiple parts can allow the speed of the low-level controller and the computational power of the high-level controller to work together and provide high fidelity models that can still react quickly to transients in the machine.

Technical effects of certain embodiments of the disclosure may include accomplishing automatic feedback control across a distributed set of controllers on a network. Further technical effects of certain embodiments of the disclosure may also include providing a complex control logic to be distributed across multiple controllers where a simple and fast low-level portion of the control algorithm is run on a real-time low-level controller and where a complex and slow high-level portion of the control algorithm is run on a non-real-time high-level controller. Yet further technical effects of certain embodiments of the disclosure may include splitting a control model into multiple sub-models to allow a speed of a low-level controller and a computational power of a high-level controller to work together and provide high fidelity control models that still react in a prompt manner to transients in a hardware asset.

The following provides a detailed description of various example embodiments related to systems and methods of industrial network monitoring.

Figure 1:
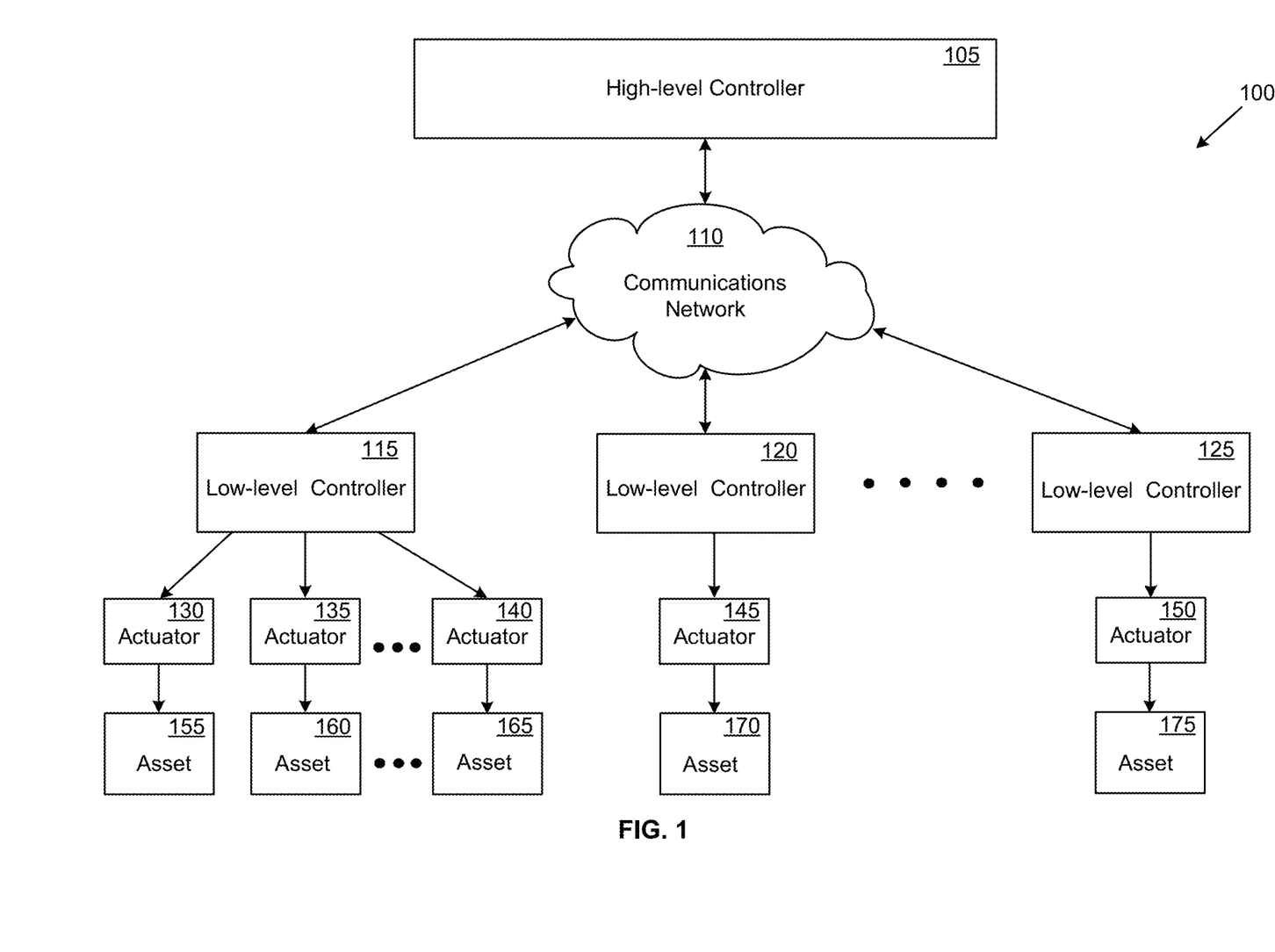
FIG. 1 illustrates a system that provides for non-homogeneous control of one or more assets, according to certain example embodiments of the disclosure.

Attention is now drawn to FIG. 1, which illustrates an example system 100 that provides for non-homogeneous control of one or more assets in accordance with an example embodiment of the disclosure. The example system 100 can include a high-level controller 105 that is communicatively coupled to one or more low-level controllers, such as a first low-level controller 115, a second low-level controller 120, and an "$n^{th}$" low-level controller 125 (n>1). In another implementation, the high-level controller 105 can be communicatively coupled to a single low-level controller. Each of the low-level controllers can be coupled to one or more actuators that actuate one or more controls (such as a temperature control, a fuel-feed control etc.) of an associated physical asset. In one example implementation, each of a first physical asset 155, a second physical asset 160, and an "$n^{th}$" physical asset 175 (n>1) is a power generation unit. The description hereon refers to the first low-level controller 115 and the asset 155 but it should be understood that the description applies equally well to the other low-level controllers and assets. Furthermore, the asset 155 may be referred to in some instances as a power generation unit, which is one example of an asset that can be operated upon in accordance with various example embodiments of the disclosure.

The communications network 110 used to provide the communicative coupling between the high-level controller 105 and the one or more low-level controllers can be any one or more of various types of communications networks such as the Internet, a private wide-area network (WAN), or a private local area network (LAN).

In accordance with the example embodiment shown in FIG. 1, the high-level controller 105 can be a server computer configured to operate with relatively complex software programs written in a high-level programming language. One example of a relatively complex software program can be a data mining program that is used to process a large quantity of raw data (such as temperature data and/or steam pressure data obtained from one or more power generation units) into useful information (such as for use in mean time between failures calculations, for determining a servicing schedule, or for scheduling a repair ahead of a failure etc.). The high-level controller 105 may include the latest hardware and may allow the software to be changed or updated on a frequent basis (every year, for example). Consequently, the high-level controller 105 may be taken offline or shut down for various reasons such as for upgrades, repairs, or reconfiguration.

On the other hand, the low-level controller 115 can be a computer containing robust and simple hardware configured to operate with relatively simple software programs. In some cases, the simple software programs may be written in a low-level programming language or in firmware. The hardware and software in the low-level controller 115 may be selected on the basis of ensuring that the low-level controller 115 offers a high mean time between failures (MTBF) and controls the asset 155 in a manner that permits the asset 155 to have a high MTBF as well. One example of a relatively simple software program is a control program that provides one or control signals to a cooling system for injecting water to cool an overheated portion of a power generation unit. The low-level controller 115 may include hardware which is highly reliable but may be outdated in some cases. The software may also be outdated. Both the hardware and the software may be selected to prevent the low-level controller 115 from being taken offline or shut down other than in extraordinary circumstances (such as a hardware failure or a natural disaster) so as to avoid interruption in distributing power to customers.

Figure 2:
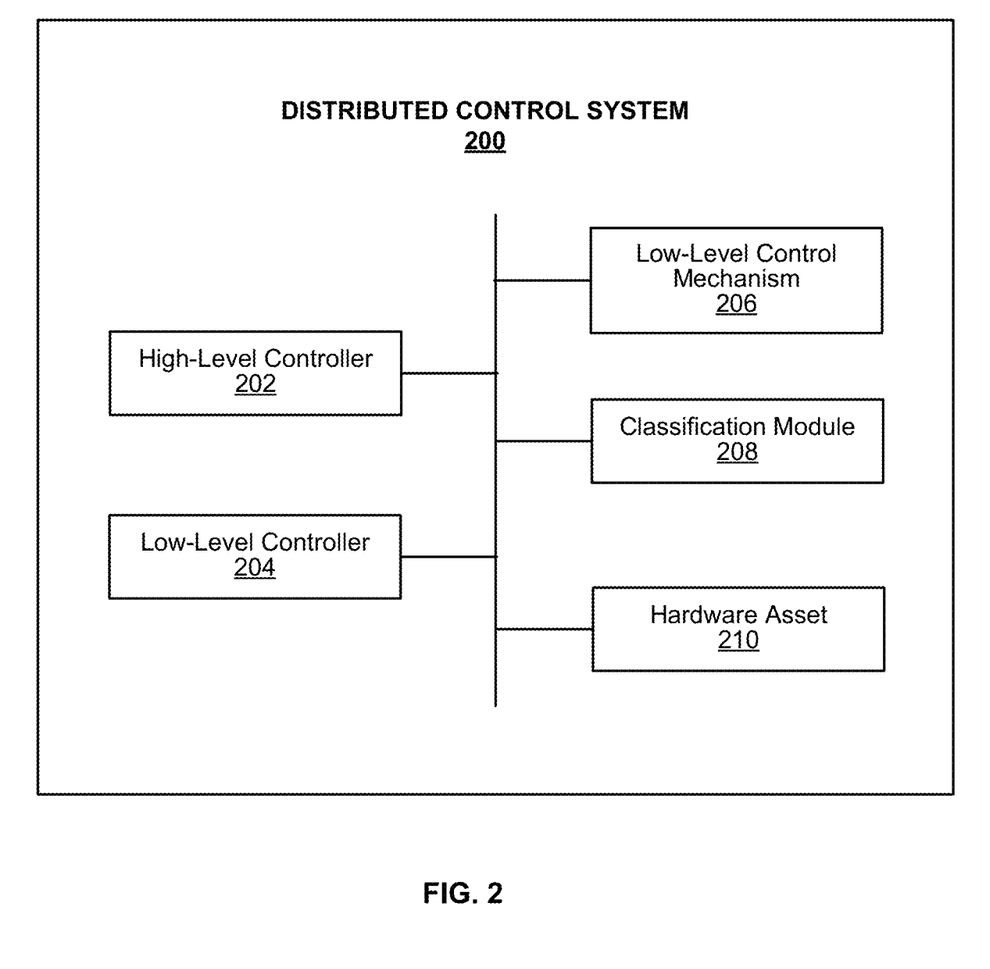
FIG. 2 is a block diagram showing an example system for automatic feedback control, according to certain example embodiments of the disclosure.

FIG. 2 is a block diagram illustrating various example modules of a system 200 for automatic feedback control, in accordance with certain embodiments of the disclosure. The system 200 may include a high-level controller 202, a low-level controller 204, a low-level control mechanism 206, a classification module 208, and a hardware asset 210. In an example embodiment, the hardware asset 210 is a power generating asset, such as a gas power plant, a steam power plant, a combined cycle power plant, and so forth.

The low-level controller 204 may be in communication with the high-level controller via a network through a communications network connection. The low-level controller 204 may be configured to receive, via the network connection, high-level control references from the high-level controller. The low-level controller 204 may be further configured to generate low-level control references for a hardware asset based at least in part on the high-level control references. The low-level controller 204 may be configured to control I/O handlers of the hardware asset. Specifically, the low-level controller 204 may be configured to control the hardware asset by providing the low-level control references to sensors and actuators associated with the hardware asset. The low-level controller 204 may be further configured to facilitate control of the hardware asset in response to detecting a loss of the network connection.

The low-level control mechanism 206 may be associated with the low-level controller 204 and may be configured to adjust the low-level control references in response to the loss of the network connection. In an example embodiment, the low-level control mechanism 206 may be further configured to receive parameters associated with the hardware asset via a control feedback mechanism. Based on the received parameters, the low-level control mechanism 206 may create setpoints and store the setpoints in at least one lookup table. The low-level control mechanism 206 may be further configured to adjust the low-level control references based on the setpoints during the loss of the network connection.

The low-level control mechanism 206 may include a surrogate module and a switch. The surrogate module may be configured to generate surrogate high-level control references. The switch may be configured to receive the high-level control references from the high-level controller. Furthermore, the switch may be configured to receive the surrogate high-level control references from the surrogate module. The switch may be configured to substitute the high-level control references with the surrogate high-level control references during the loss of the network connection.

In a further example embodiment, the low-level control mechanism 206 may be configured to combine the high-level control references with the low-level control references while the network connection is not in a loss of a connection status between the low-level controller and high-level controller. The low-level control mechanism 206 may transfer control of the hardware asset based on the low-level control references during the loss of the network connection.

The high-level controller 202 may be configured to perform more computationally complex processing than the low-level controller 204. In view of this, the classification module 208 may be configured to classify components of the distributed control system into one or more sub-models based on predetermined criteria. The predetermined criteria may include at least one of the following: a fidelity requirement and a speed of execution requirement. Based on the classification, the classification module 208 may associate the one or more sub-models with one of the following: the high-level controller and the low-level controller. The classification module 208 may further assign a rate to the one or more sub-models. The rate may be indicative of a speed with which an answer to an inter-module request is produced by the one or more sub-models.

Figure 3:
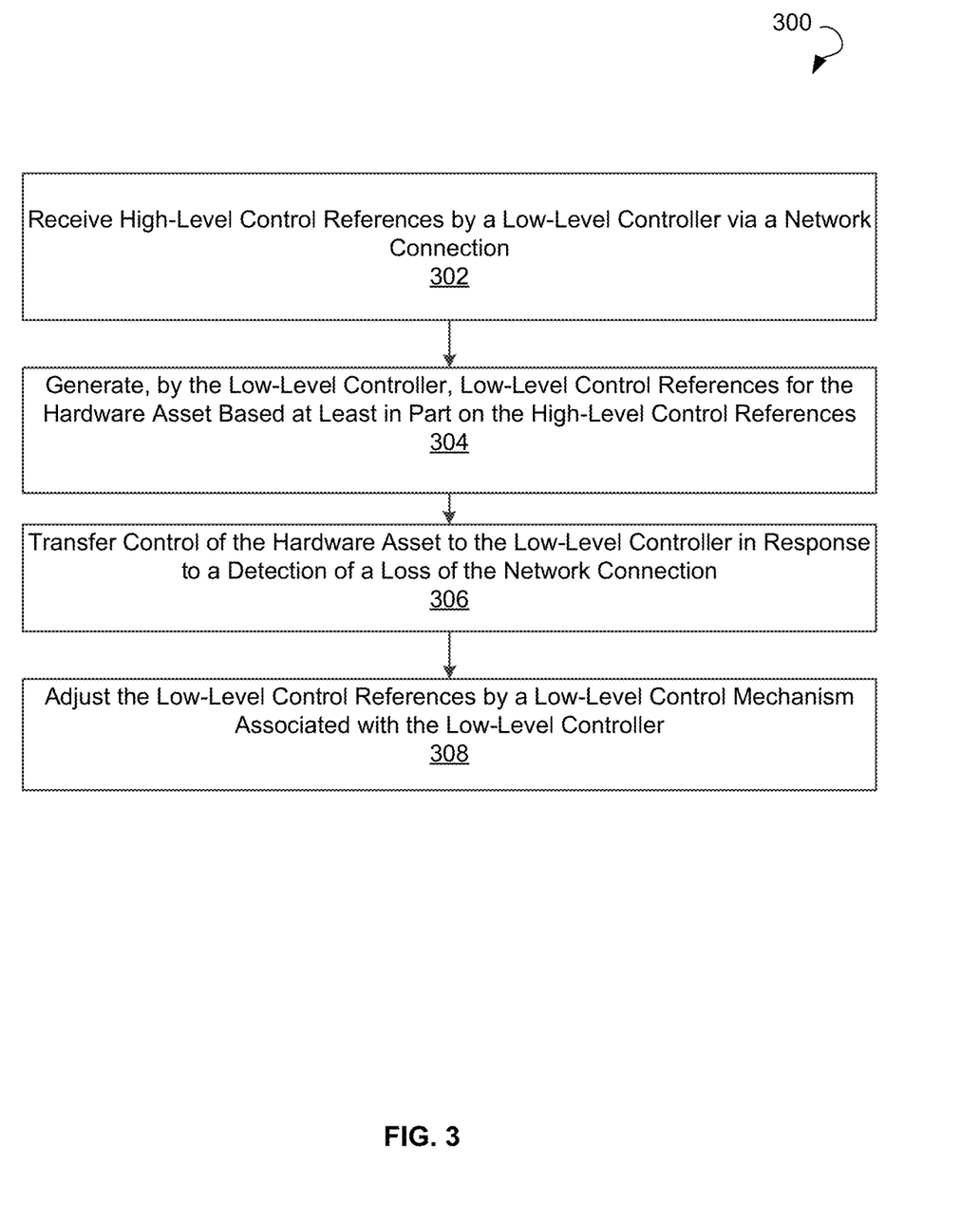
FIG. 3 is a flow chart illustrating an example method for automatic feedback control in a distributed control system, according to certain example embodiments of the disclosure.

FIG. 3 depicts a process flow diagram illustrating an example method 300 for feedback control in a distributed control system, in accordance with an embodiment of the disclosure. The method 300 may be performed by processing logic that may comprise hardware (e.g., dedicated logic, programmable logic, and microcode), software (such as software run on a general-purpose computer system or a dedicated machine), or a combination of both.

As shown in FIG. 3, the method 300 may commence at operation 302 with receiving high-level control references by a low-level controller communicatively coupled to a high-level controller via the network connection at operation 302.

The method 300 may further include generating, by the low-level controller, low-level control references for a hardware asset based at least in part on the high-level control references at operation 304. The method 300 may continue with transferring control of the hardware asset to the low-level controller in response to a loss of the network connection at operation 306. The method may further include adjusting the low-level control references by a low-level control mechanism associated with the low-level controller in response to the loss of the network connection at operation 308.

In an example embodiment, the method 300 may further include receiving, by the low-level control mechanism, parameters associated with the hardware asset via a control feedback mechanism. Based on the received parameters, the low-level control mechanism may create setpoints and store the setpoints to a lookup table. Based on the setpoints, the low-level control mechanism may adjust the low-level control references during the loss of the network connection.

The low-level controller may be configured to control I/O handlers of the hardware asset. Specifically, the control of the hardware asset may be performed by providing the low-level control references to the low-level controller to sensors and actuators associated with the hardware asset.

In an example embodiment, the method 300 may further include generating surrogate high-level control references by a surrogate module of the low-level control mechanism. The method 300 may further include receiving the high-level control references by a switch of the low-level control mechanism from the high-level controller. The switch may substitute the high-level control references with the surrogate high-level control references during the loss of the network connection.

In an example embodiment, the method 300 may further include combining the high-level control references with the low-level control references by the low-level control mechanism while the network connection is not in a loss of a connection status between the low-level controller and high-level controller. The low-level control mechanism may facilitate control of the hardware asset based on the low-level control references during the loss of the network connection.

In an example embodiment, the method 300 may further include classifying, by a classification module, components of the distributed control system into one or more sub-models based on predetermined criteria. The predetermined criteria may include at least one of the following: a fidelity requirement and a speed of execution requirement. Based on the classification, the classification module may associate the one or more sub-models with one of the following: the high-level controller or the low-level controller. The high-level controller may be configured to perform more computationally complex processing than the low-level controller.

Figure 4:
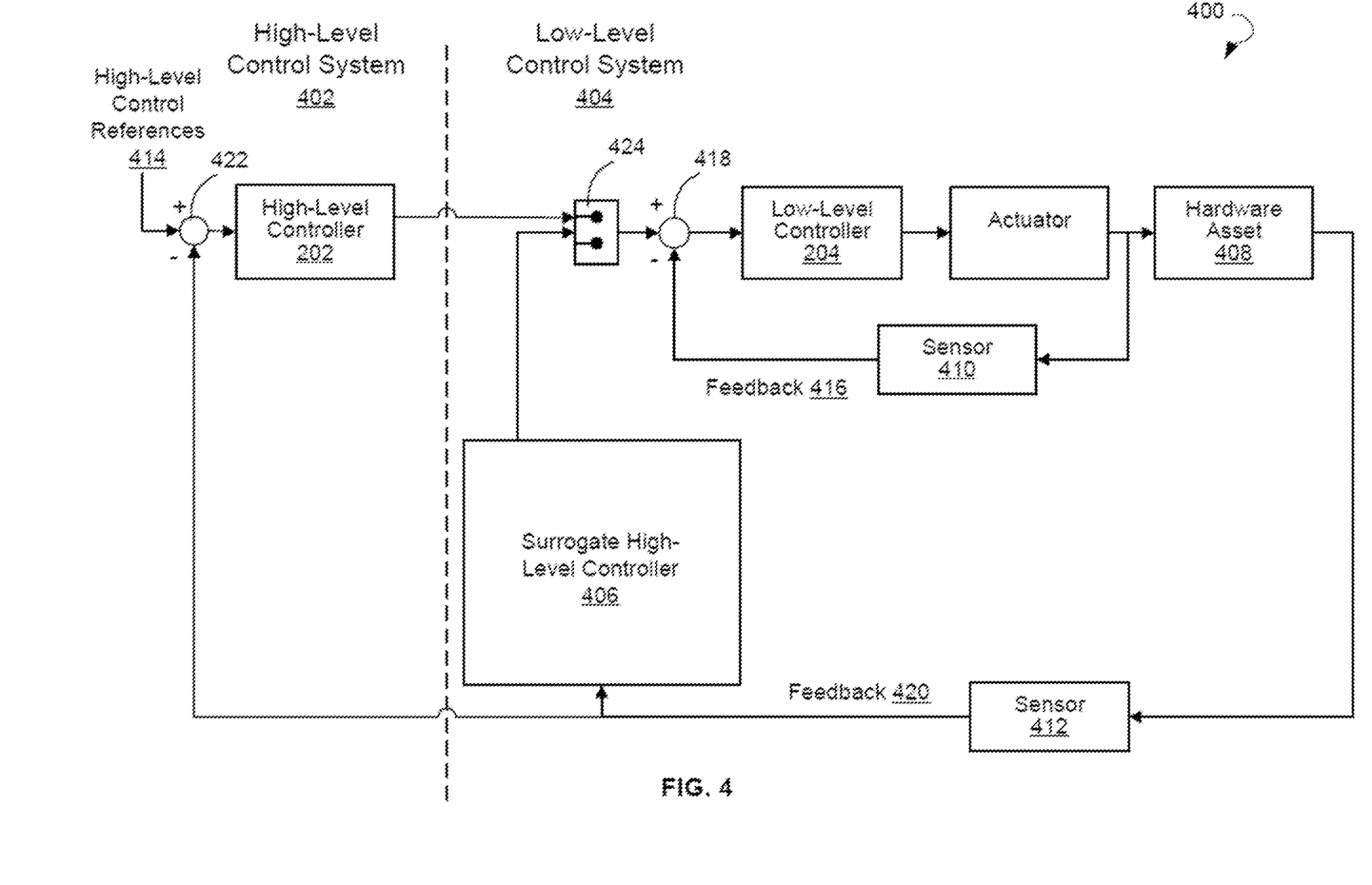
FIG. 4 is a block diagram illustrating an automatic feedback control system with a distributed set of controllers using surrogate sub-models, according to certain example embodiments of the disclosure.

FIG. 4 is a block diagram illustrating an automatic feedback control system 400 with a distributed set of controllers using surrogate sub-models, according to an example embodiment. The system 400 is a combination of a high-level control system 402 represented by a high-level controller 202 and a low-level control system 404 represented by a low-level controller 204. The low-level control system 404 further has a surrogate high-level controller 406.

A hardware asset 408 is controlled by a control algorithm that includes an automatic feedback control split between the high-level controller 202 and the low-level controller 204. There is a hierarchy in controlling functions of the high-level controller 202 and the low-level controller 204. PID loops and a set of cascading controllers may be used in the control algorithm. The high-level controller 202 may be an outer-loop controller, and the low-level controller 204 may be an inner-loop controller. Specifically, the high-level controller 202 is configured to provide high-level control references 414 for controlling the hardware asset 408. The low-level controller 204 is configured to control I/O handlers of the hardware asset 408. The I/O handlers may include a sensor 410, a sensor 412, and an actuator 406. The low-level controller 204 may collect feedback 416 from the sensor 410 associated with the actuator 406 and provide the feedback 416 to a summing junction 418. Additionally, the low-level controller 204 may collect feedback 420 from the sensor 412 associated with the hardware asset 408 and provide the feedback 416 to a summing junction 422 of the high-level control system 402.

If there is a network loss between the high-level controller 202 and the low-level controller 204, the low-level controller 204 cannot accomplish the controlling functions of the high-level controller 202. However, the actuator under control may not be impacted by the network loss. In view of this, the controlling functions of the high-level controller 202 are switched from the high-level controller 202 to the surrogate high-level controller 406.

Therefore, in case of the network loss, the control may be performed by the low-level controller 204 and the surrogate high-level controller 406 residing in the low-level control system 404. Specifically, the low-level control system 404 may have a switch 424. The surrogate high-level controller 406 may be configured to generate surrogate high-level control references and provide the surrogate high-level control references to the low-level controller 204 for controlling the hardware asset 408.

The switch 424 may be configured to receive the high-level control references from the high-level controller 202 and receive the surrogate high-level control references from the surrogate high-level controller 406. During the loss of the network connection, the switch 424 may substitute the high-level control references with the surrogate high-level control references. Therefore, the control references provided to the low-level controller 204 during the loss of the network connection may include surrogate high-level control references. Moreover, the feedback 420 from the sensor 412 associated with the hardware asset 408 collected by the low-level controller 204 may be provided to the surrogate high-level controller 406. The surrogate high-level controller 406 may use the feedback 420 to update the surrogate high-level control references.

Figure 5:
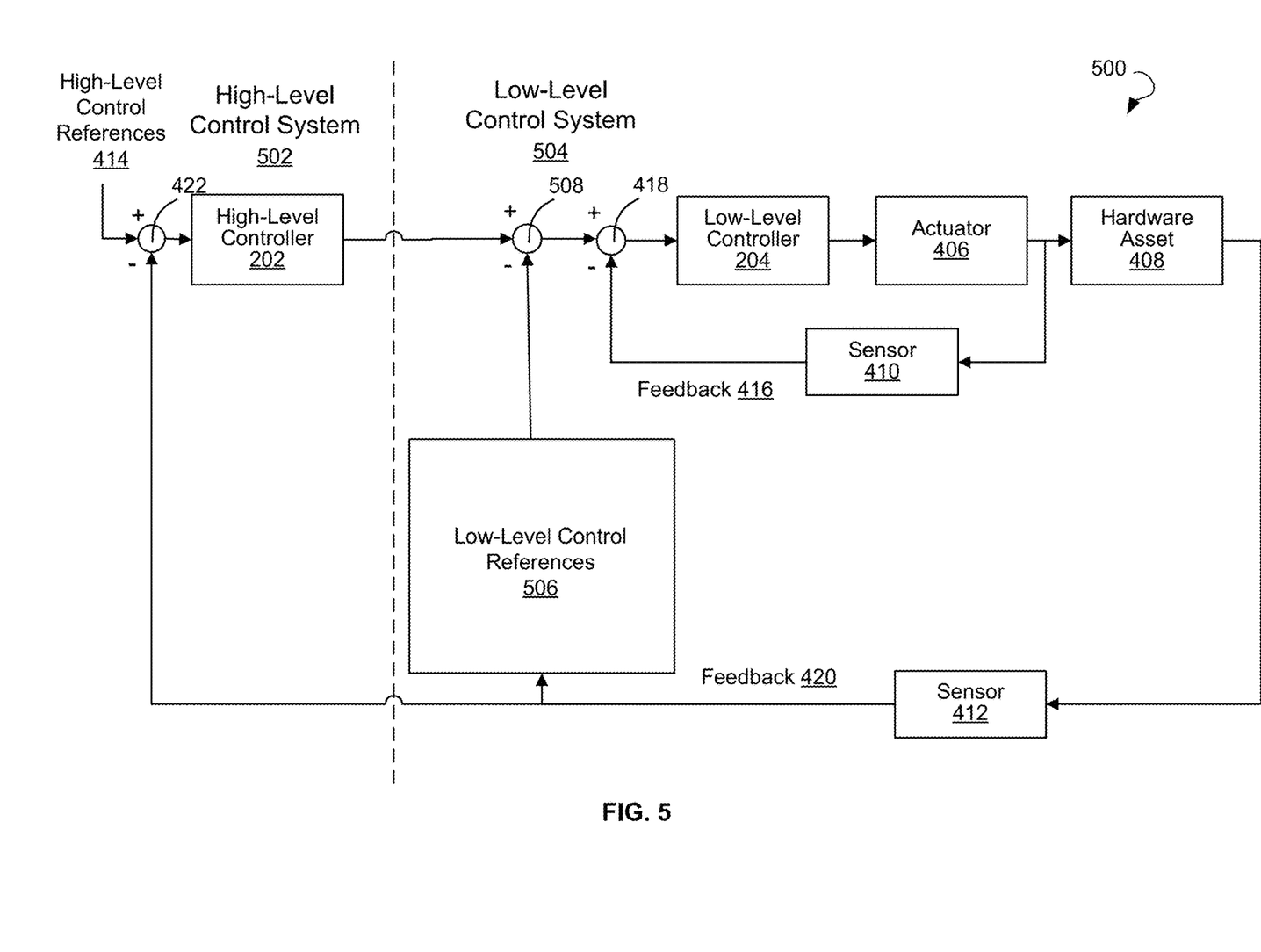
FIG. 5 is a block diagram illustrating an automatic feedback control system with a distributed set of controllers using biasing sub-models, according to certain example embodiments of the disclosure.

FIG. 5 is a block diagram illustrating an automatic feedback control system 500 with a distributed set of controllers using biasing sub-models, according to an example embodiment. The system 500 is a combination of a high-level control system 502 represented by a high-level controller 202 and a low-level control system 504 represented by a low-level controller 204. In the system 500, the low-level controller 204 may collect feedback 416 from the sensor 410 associated with the actuator 406 and provide the feedback 416 to a summing junction 418 of the low-level control system 504. Additionally, the low-level controller 204 may collect feedback 420 from the sensor 412 associated with the hardware asset 408, generate low-level control references 506, and provide the low-level control references 506 to a summing junction 508 of the low-level control system 504. Furthermore, the high-level controller 202 may act as a feed-forward control component of the system 500. Specifically, the high-level controller 202 may receive the feedback 420 at the summing junction 422 and provide high-level control references 414 generated based on the feedback 420 to the summing junction 508 of the low-level control system 504.

Therefore, the high-level control references 414 of the high-level controller 202 and the low-level control references 506 may be summarized in the summing junction 508. Thus, the biasing sub-model includes adding an output of the high-level controller 202, i.e., the high-level control references 414, to the low-level control references 506. The low-level control references 506 may include a function or a lookup table and may be adjusted based on the high-level control references 414 of the high-level controller 202. In this biasing sub-model, it is possible to have a loop at the high-level control system 502 that can periodically lose connection to the low-level control system 504 without suffering from problems related to the loss of connection because the control may be taken by the low-level controller 204. In case of the connection loss, the low-level controller 204 may control the hardware asset 408 based on the low-level control references 506. When the connection between the low-level controller 204 and the high-level controller 202 is restored, the high-level controller 202 may continue sending the high-level control references 414 to the summing junction 508 to adjust the low-level control references 506 by combining the high-level control references 414 with the low-level control references 506.

Figure 6:
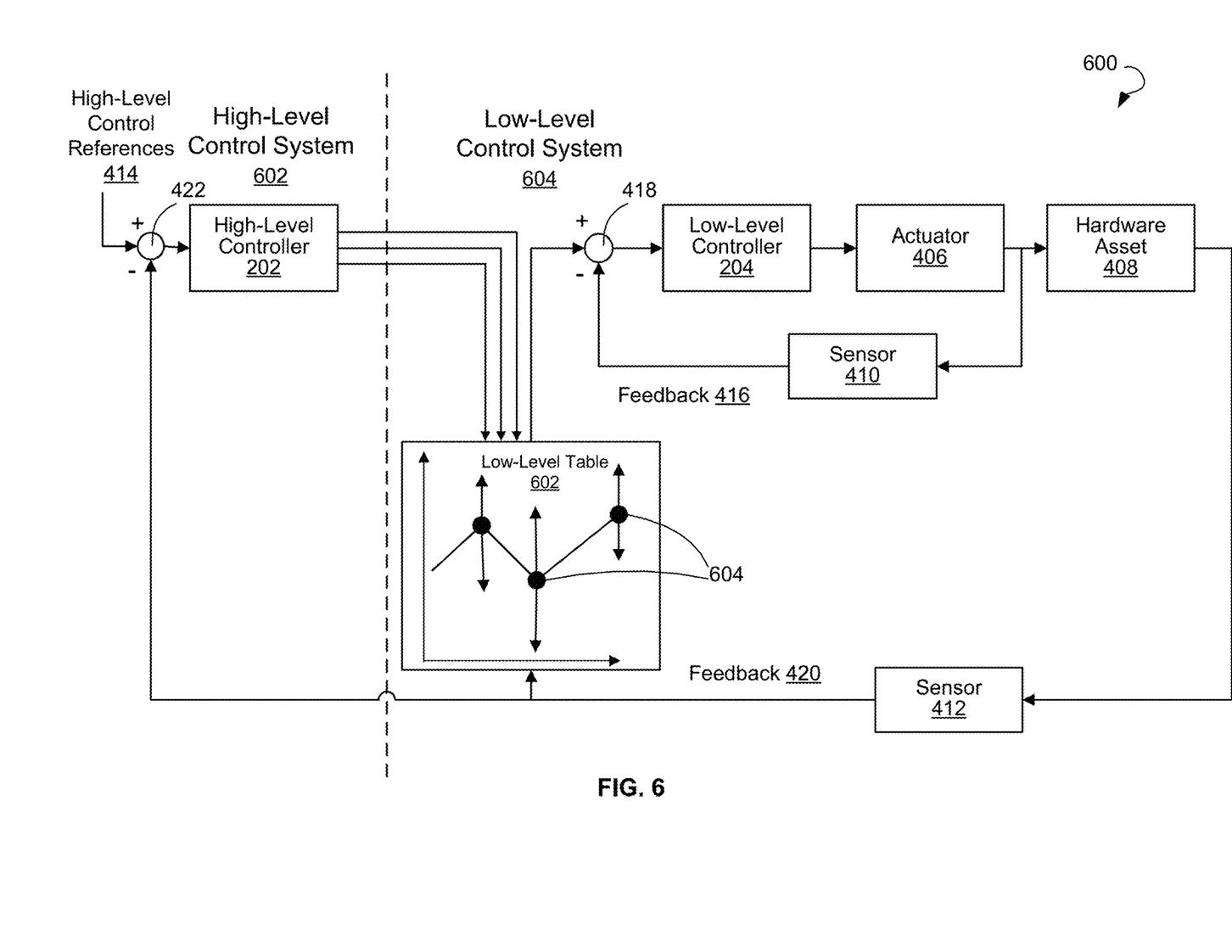
FIG. 6 is a block diagram illustrating an automatic feedback control system with a distributed set of controllers using adapting sub-models, according to certain example embodiments of the disclosure.

FIG. 6 is a block diagram illustrating an automatic feedback control system 600 with a distributed set of controllers using adapting sub-models, according to an example embodiment. The system 600 is a combination of a high-level control system 602 represented by a high-level controller 202 and a low-level control system 604 represented by a low-level controller 204. In the system 600, the low-level controller 204 may collect feedback 420 from the sensor 412 associated with the hardware asset 408 and provide the feedback 416 to a lookup table shown as a low-level table 602. Additionally, the high-level controller 202 may receive feedback 420 at the summing junction 422 and provide high-level control references 414 generated based on the feedback 420 to the low-level table 602 of the low-level control system 504. Based on the received parameters, namely the high-level control references 414 and the feedback 420 from the low-level controller 204, setpoints 604 may be created and stored in the low-level table 602. During the loss of the network connection between the high-level controller 202 and the low-level controller 204, the low-level control references may be adjusted based on the setpoints. The low-level control references adjusted based on the setpoints may be provided to the summing junction 418. In the summing junction 418, the low-level control references may be further adjusted based on feedback 416 collected by the low-level controller 204 from the sensor 410 associated with the actuator 406 and provided to the summing junction 418.

In this adapting, or "tuning," sub-model, it is possible to have a slow tuning loop at the high-level control system 602 that can periodically lose connection to the low-level control system 604 without suffering from problems related to the loss of connection because the control may be taken by the low-level controller 204.

Figure 7:
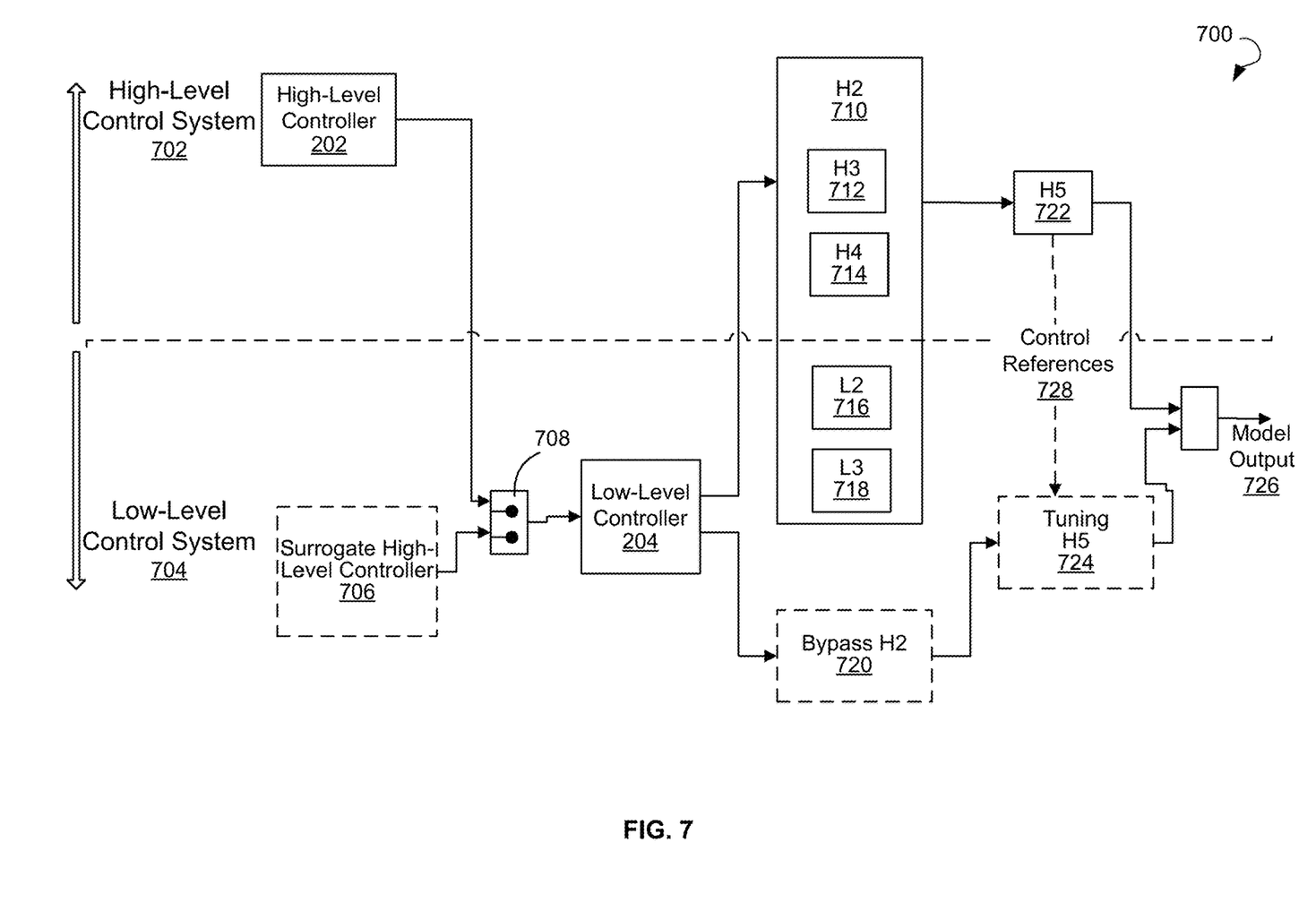
FIG. 7 is a block diagram illustrating an automatic feedback control system with a distributed set of controllers using multiple sub-models, according to certain example embodiments of the disclosure.

FIG. 7 is a block diagram illustrating an automatic feedback control system 700 with a distributed set of controllers using multiple sub-models, according to an example embodiment. The system 700 is a combination of a high-level control system 702 represented by a high-level controller 202 and a low-level control system 704 represented by a low-level controller 204. In case of the loss of connection between the high-level controller 202 and the low-level controller 204, the sub-models enable either use of the low-level controller 204 with no tuning of the control references performed, or use of a surrogate high-level controller of lower complexity to replace the high-level controller in a degraded manner until the network connection between the high-level controller 202 and the low-level controller 204 is restored.

The system 700 uses multiple sub-models to achieve the objectives of high fidelity (which can be achieved only in the high-level controller 202) and high speed of execution for matching fast transients (which can only be achieved in the faster real-time controller, i.e., the low-level controller 204). To allow both objectives to be achieved, the system 700 is split into multiple sub-models, with some connected in series or parallel and some in a cascade format where a high-level slow model of the high-level controller 202 contains the faster low-level model of the low-level controller 204. Sub-models are classified by a classification module based on predetermined criteria, such as a fidelity requirement, a speed of execution requirement, and so forth.

Sub-models that need to match collected input data from the high-level controller 202 and output data from sensors, particularly changing data from the sensors or data that are important during fast transients, are placed in the low-level control system 704 and are also referred to as low-level sub-models. The remaining sub-models and sub-models configured to perform more computationally complex processing are left in the high-level control system 702 and are also referred to as high-level sub-models.

Specifically, the low-level sub-models may include a surrogate high-level controller 706. The surrogate high-level controller 706 allows avoiding the loss of the control over a hardware asset in case of a loss of connection between the high-level controller 202 and the low-level controller 204. The functions of the surrogate high-level controller are described with reference to FIG. 4 above. The surrogate high-level controller 706 may be an optional component of the system 700. The high-level references from the high-level controller 202 and the control references from the surrogate high-level controller 706 may be provided to a switch 708 so that the switch 708 sends the references from the surrogate high-level controller 706 to the low-level controller 204 during the network loss.

The low-level controller 204 may provide the control references to the high-level controller H2, shown as high-level controller 710. The high-level controller 710 may reside in both the high-level control system 702 and the low-level control system 704. The high-level controller 710 may include high-level controllers H3 and H4, shown as high-level controllers 712 and 714, respectively. Moreover, the level controller 710 may include low-level controllers L2 and L3, shown as low-level controllers 716 and 718, respectively.

In the high-level controller 710, the high-level sub-models of the high-level controller 712 and 714 are parent to faster low-level sub-models of the low-level controllers 716 and 718 and require software to broker the exchange between disparate timeframes of sensing data. In the high-level controller 710, parameters may be passed between the high-level sub-models and low-level sub-models at a rate of the high-level sub-models, or an array of data may be collected for matching at the low-level sub-models and passing the array up to the high-level sub-models.

The high-level controller 710 may use the high-level controllers 712 and 714 to perform computationally intensive processing and may use the low-level controllers 716 and 718 to perform high speed real-time processing. The output data of the high-level controller 710 may be provided to a high-level controller H5, shown as a high-level controller 722. The high-level controller 722 may provide the output data as a model output 726.

In case of loss of connection with the high-level controller 710, a bypass high-level controller H2, shown as a bypass high-level controller 720, may be used. The bypass high-level controller 720 may use a biasing model described with reference to FIG. 5 above.

Because the connection with the high-level controller 722 is also lost, the bypass high-level controller 720 may provide the output data to a tuning high-level controller H5, shown as a tuning high-level controller 724. The high-level controller 724 may receive control references 728 from the high-level controller 722 when the connection is active. The tuning high-level controller 724 may use the output data received from the bypass high-level controller 720 and the control references 728 previously received from the high-level controller 722 to provide the output data as the model output 726. The tuning model used by the tuning high-level controller 724 is described with reference to FIG. 6 above. The bypass high-level controller 720 and the tuning high-level controller 724 may be optional components of the system 700.

Therefore, the surrogate high-level controller 706, the bypass high-level controller 720, and the tuning high-level controller 724 may be used in case of the network loss, where the surrogate high-level controller 706 is a direct surrogate of the high-level controller 202 that performs the same operations with less intensive computations, the bypass high-level controller 720 is used to bypass the high-level controller 710 entirely, and the tuning high-level controller 724 is used to constantly tune the system 700 while the high-level controller 720 is active and when adjusted setpoints may be still used when the high-level controller 722 shuts off.

The classification module assigns a rate to each of the sub-models. The rate may be indicative of a speed with which an answer to an inter-module request is produced by the sub-models. Therefore, because the sub-models are divided between the low-level control system 704 and the high-level control system 702, the system 700 may still control a hardware asset in case of a loss of a connection between the high-level controller 202 and the low-level controller 204.

Figure 8:
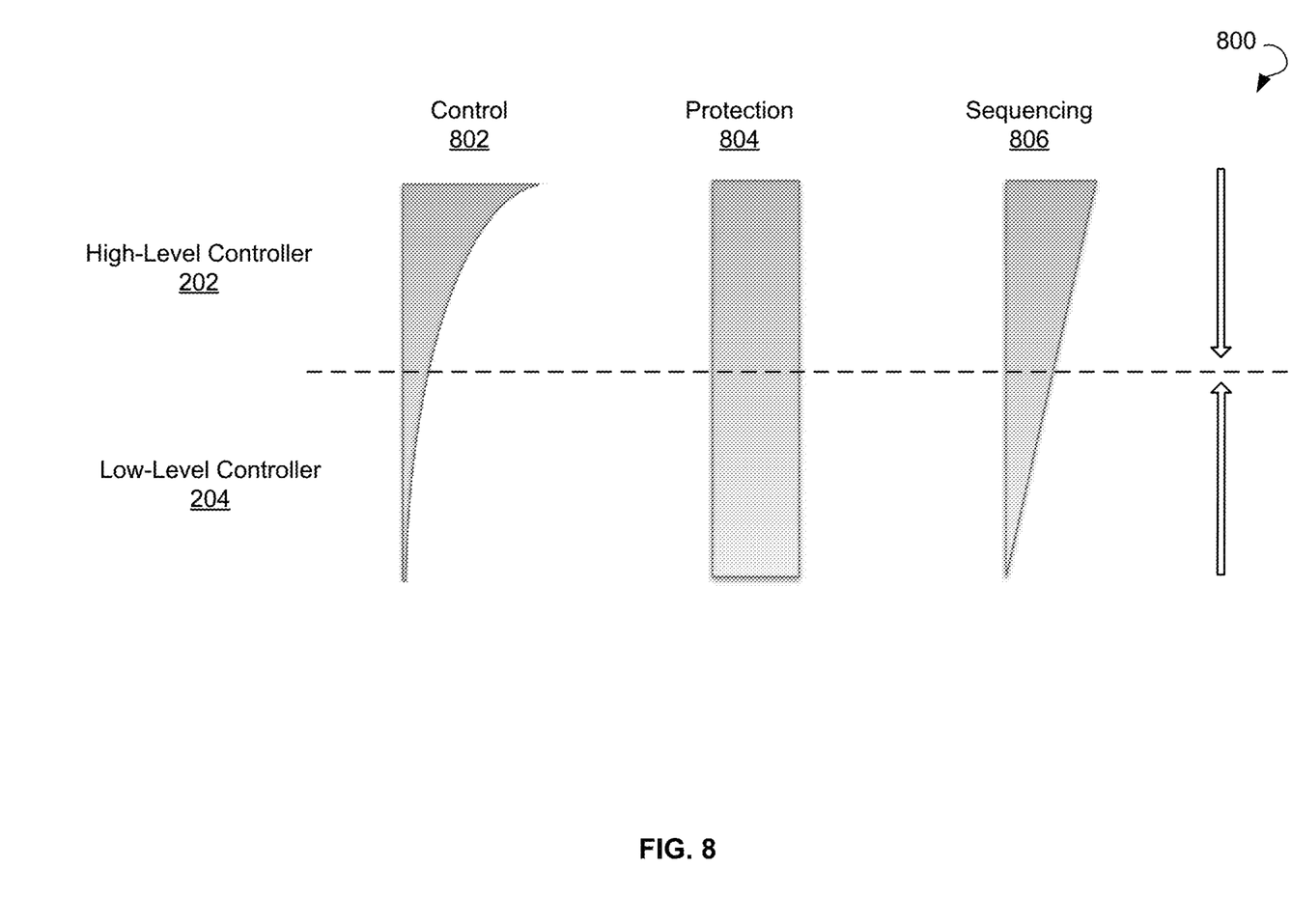
FIG. 8 is a diagram showing distribution of control, protection, and sequencing functions between a high-level controller and a low-level controller, according to certain example embodiments of the disclosure.

FIG. 8 is a diagram 800 showing distribution of control, protection, and sequencing functions between a high-level controller 202 and a low-level controller 204, according to an example embodiment. As to control function 802, the low-level controller 204 processes a code that is simpler than code processed by the high-level controller 202. However, complexity of the code increases exponentially. The technologies and approaches being used may include Integrative Genomics Viewer (IGV) Tech control, IBH position loop, Model-based Optimizers, and so forth.

The protection function 804 has a uniform simplicity for the high-level controller 202 and the low-level controller 204. In may be beneficial to keep the code close to I/O level. The technologies and approaches being used may include SpreadMonitor, which is a spread logging indicator that displays the current, minimum/maximum, and average spread values, lube oil pressure, tech overtemp trip, and so forth.

The complexity of sequencing function 806 increases uniformly. However, it may be challenging to split sequencing tasks between the high-level controller 202 and the low-level controller 204. The technologies and approaches being used may include DLN Mode transfer logic, Purge Credit, Startup, and so forth.

Figure 9:
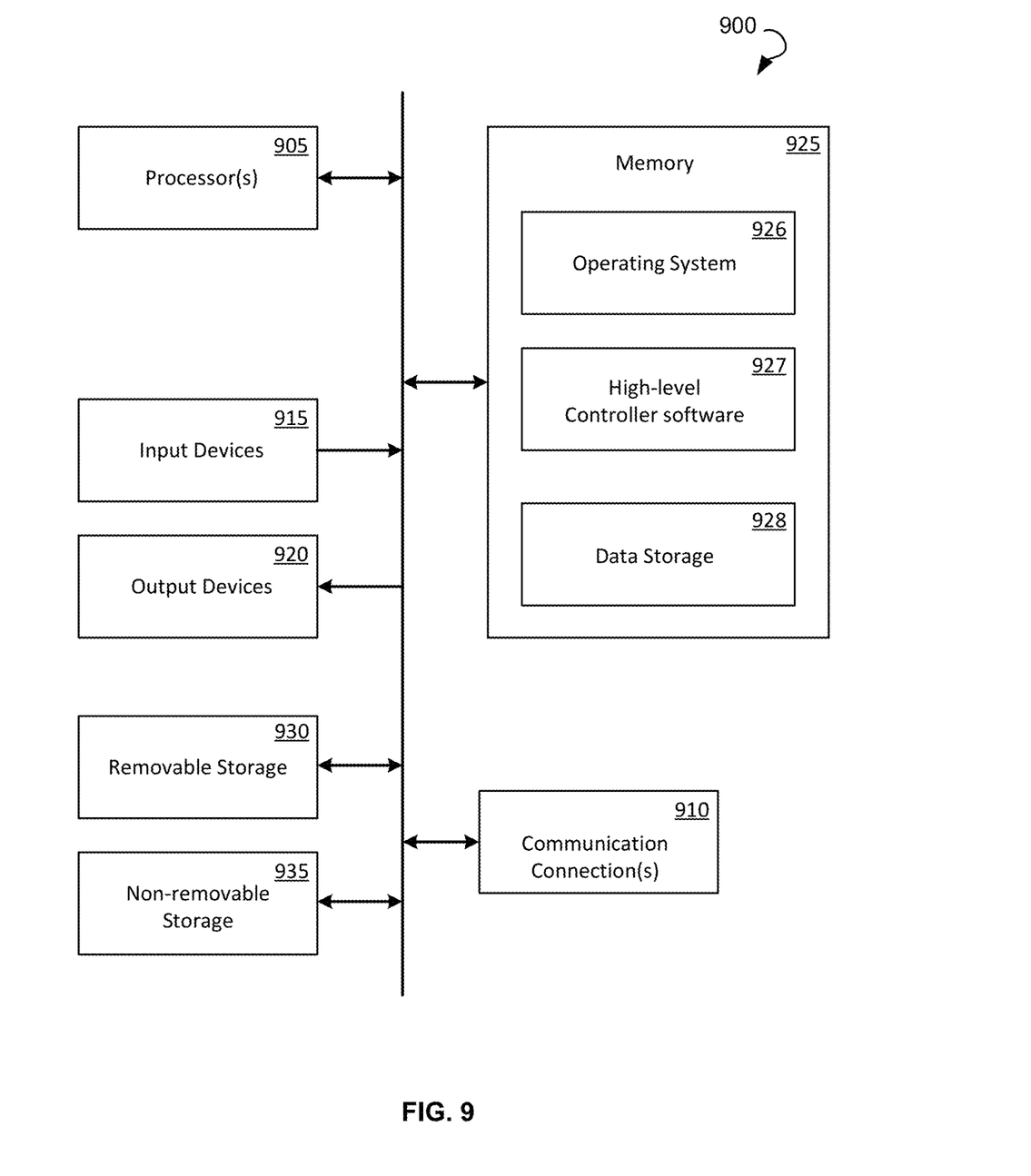
FIG. 9 illustrates components that can be included in a computer configured to operate as a high-level controller, according to certain example embodiments of the disclosure.

FIG. 9 illustrates example components that can be included in a computer 600 configured to operate as the high-level controller 105 in accordance with an example embodiment of the disclosure. It should be understood that in various example embodiments, the high-level computer 105 may be configured as a server computer. Accordingly, some of the hardware elements described below with reference to FIG. 9 may be omitted and other elements that are typically used for operating a server computer may be used instead.

The high-level controller 105 may include a processor 905 capable of communicating with a memory 925. The processor 905 may be implemented as appropriate in hardware, software, firmware, or combinations thereof. Software or firmware implementations of the processor 905 may include computer-executable or machine-executable instructions written in any suitable programming language to perform the various functions described. In one embodiment, instructions associated with a function block language may be stored in the memory 925 and executed by the processor 905.

A memory 925 may store program instructions that are loadable and executable on the processor 905, as well as data generated during the execution of these programs. Depending on the configuration and type of the high-level controller 105, the memory 925 may be volatile (such as random-access memory (RAM)) and/or non-volatile (such as read-only memory (ROM), flash memory, etc.). In some embodiments, the high-level controller 105 may also include additional removable storage 930 and/or non-removable storage 935 including, but not limited to, magnetic storage, optical disks, and/or tape storage. The memory 925 and associated computer-readable media may provide non-volatile storage of computer-readable instructions, data structures, program modules, and other data for the devices. In some implementations, the memory 925 may include multiple different types of memory, such as static random-access memory (SRAM), dynamic random-access memory (DRAM), or ROM.

The memory 925, removable storage 930, and non-removable storage 935 are all examples of non-transitory computer-readable storage media. Non-transitory computer-readable storage media may include volatile and non-volatile, removable and non-removable media implemented in any method or technology for storage of information such as computer-readable instructions, data structures, program modules or other data. Additional types of non-transitory computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of non-transitory computer-readable media.

The high-level controller 105 may also include one or more communication connections 910 that may allow the high-level controller 105 to communicate with devices or equipment capable of communicating with the high-level controller 105. The connections can be established via various data communication channels or ports, such as USB or COM ports to receive connections for cables connecting a control device to various other devices on a network, such as the communications network 110. In one embodiment, the high-level controller 105 may include Ethernet drivers that enable the high-level controller 105 to communicate with other devices. According to various embodiments, the communication connections 910 may be established via one or more wired and/or wireless connection.

The high-level controller 105 may also include one or more input devices 915, such as a keyboard, mouse, pen, voice input device, and touch input device. The high-level controller 105 may further include one or more output devices 920, such as a display, printer, and speakers.

Turning to the contents of the memory 925, the memory 925 may include, but is not limited to, an operating system (OS) 926 (such as may be used in a server computer) and one or more application programs or services for implementing the features and aspects disclosed herein with reference to the high-level controller 105. Such applications or services may include high-level controller software 927 and data storage 928.

Figure 10:
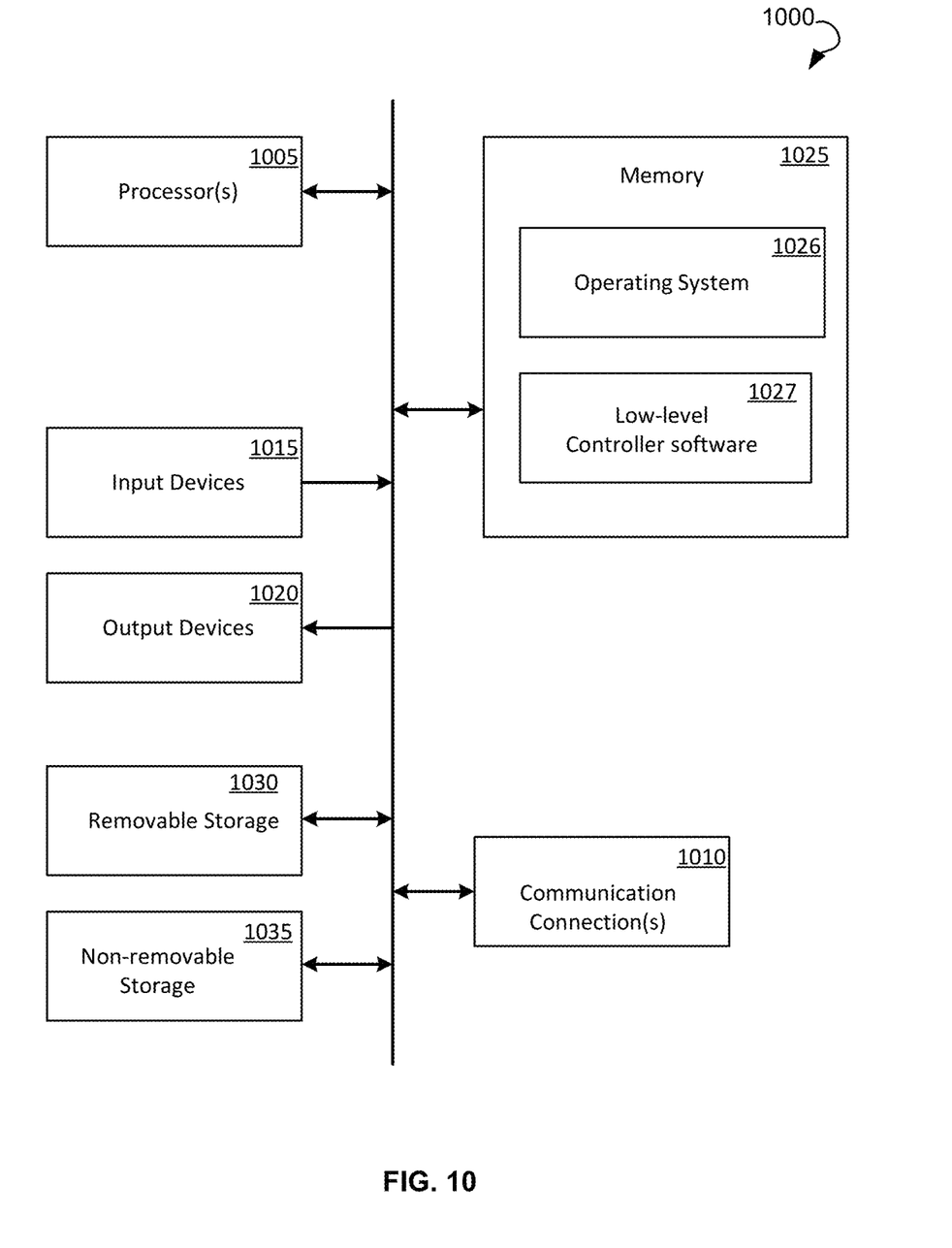
FIG. 10 illustrates components that can be included in a computer configured to operate as a low-level controller, according to certain example embodiments of the disclosure.

FIG. 10 illustrates some example elements that can be included in a computer 1000 configured to operate as the low-level controller 115 in accordance with an example embodiment of the disclosure. The processor 1005, input devices 1015, output devices 1020, removable storage 1030, and non-removable storage 1035, and communication connection(s) 1010 that are shown in FIG. 10 are identical or substantially similar to corresponding elements shown in FIG. 9 and described above. Consequently, these elements will not be described here. However, attention is drawn to the memory 1025 that may be a part of the computer configured to operate as the low-level controller 115. The memory 1025 may include, but is not limited to, an operating system (OS) 1026 (such as may be used in a client computer) and one or more application programs or services for implementing the features and aspects disclosed herein with reference to the low-level controller 115. Such applications or services may include low-level controller software 1027. The low-level controller software 1027 may be executed by the processor 1005.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A distributed control system comprising:
   a low-level control system comprising:
     a hardware asset,
     a low-level controller in communication with the hardware asset,
     Input/Output (I/O) handlers associated with the hardware asset, wherein the I/O handlers comprise a first sensor, a second sensor, and one or more actuators,
     a first low-level summing junction communicatively coupled with the low-level controller and configured to adjust high-level control references based on low-level control references and feedback from the second sensor, and
     a second low-level summing junction communicatively coupled with the low-level controller and configured to further adjust the high-level control references based on feedback from the first sensor,
   a high-level control system comprising:
     a high-level controller, and
     a high-level summing junction configured to adjust high-level control references based on feedback from the second sensor;
   wherein:
     the low-level controller of the low-level control system is in communication with the high-level controller via a network through a communication network connection, and is configured to control the I/O handlers of the hardware asset;
     the first sensor is configured to directly provide feedback to the second low-level summing junction,
     the second sensor is configured to provide feedback to the high-level summing junction and the first low-level summing junction, and
     the low-level controller is configured to:
       receive, via the communication network connection, the adjusted high-level control references from the high-level controller, wherein the adjusted high-level control references have been adjusted (i) by the high-level summing junction based on the feedback from the second sensor, (ii) by the first low-level summing junction based on the low-level control references and the feedback from the second sensor, and (iii) by the second low-level summing junction based on the feedback from the first sensor;
       generate low-level control references for the hardware asset based on the high-level control references and on the feedback from the second sensor; and
       control the hardware asset in response to detecting a loss of the communication network connection, the low-level control mechanism is configured to adjust the low-level control references in response to the loss of the communication network connection; and
the low-level control mechanism is further configured to:
transfer control of the hardware asset based on the low-level control references during the loss of the network connection.

2. The system of claim 1, wherein the low-level controller is configured to control the hardware asset by providing the low-level control references to the one or more actuators associated with the hardware asset.

3. The system of claim 1, wherein the low-level control system further comprises a classification module configured to:
classify components of the distributed control system into one or more sub-models based on predetermined criteria; and
based on the classification, associate the one or more sub-models with the high-level controller or the low-level controller.

4. The system of claim 3, wherein the predetermined criteria include at least one of the following: a fidelity requirement and a speed of execution requirement.

5. The system of claim 3, wherein the high-level controller is configured to perform more computationally complex processing than the low-level controller.

6. The system of claim 3, wherein the classification module is configured to assign a rate to the one or more sub-models, the rate being indicative of a speed with which an answer to an inter-module request is produced by the one or more sub-models.

7. A method for feedback control in a distributed control system comprising a low-level control system having a surrogate high-level controller, a hardware asset, a low-level controller in communication with the hardware asset, wherein the low-level controller comprises a switch configured to: receive high-level control references from the high-level controller, receive surrogate high-level control references from a surrogate module, and substitute the high-level control references with the surrogate high-level control references during a loss of the communication network connection, a sensor configured to measure a control variable associated with the hardware asset, and a low-level control mechanism communicatively coupled with the low-level controller, wherein the distributed control system further comprises the high-level controller being in communication with the low-level controller of the low-level control system via a network through the communication network connection, the method comprising:
sending, by the sensor of the distributed control system, feedback to the high-level controller and the surrogate high-level controller;
adjusting the high-level control references based on the feedback of the sensor associated with the hardware asset;
receiving, via the communication network connection, the adjusted high-level control references from the high-level controller;
generating low-level control references for the hardware asset based on the adjusted high-level control references and on the feedback; and
controlling the hardware asset in response to detecting a loss of the communication network connection to the high-level controller,
wherein the low-level control mechanism is configured to adjust the low-level control references facilitate control of the hardware asset in response to the loss of the communication network connection; and
the low-level control mechanism is further configured to:
adjust the low-level control references in response to the loss of the communication network connection;
combine the high-level control references with the low-level control references while the network connection is not in a loss of a connection status between the low-level controller and the high-level controller; and
transfer control of the hardware asset based on the low-level control references during the loss of the network connection.

8. The method of claim 7, wherein the low-level controller is configured to control the hardware asset by providing the low-level control references to actuators associated with the hardware asset.

9. The method of claim 7, further comprising:
classifying, by a classification module, components of the distributed control system into one or sub-models based on predetermined criteria; and
based on the classification, associating, by the classification module, the one or more sub-models with one of the following: the high-level controller and the low-level controller.

10. The method of claim 9, wherein the predetermined criteria include at least one of the following: a fidelity requirement and a speed of execution requirement.

11. The method of claim 9, wherein the high-level controller is configured to perform more computationally complex processing than the low-level controller.

* * * * *